United States Patent
Osaki et al.

(10) Patent No.: US 8,019,520 B2
(45) Date of Patent: Sep. 13, 2011

(54) VEHICLE DRIVE CONTROL DEVICE

(75) Inventors: Shintaro Osaki, Nisshin (JP); Hiroyuki Kodama, Kariya (JP); Masayoshi Takeda, Kariya (JP); Kazunori Kadowaki, Nagoya (JP); Yasuhiro Nakai, Kariya (JP); Hajime Kumabe, Kariya (JP); Shotaro Fukuda, Obu (JP)

(73) Assignees: Advics Co., Ltd., Kariya, Aichi-Pref (JP); Denso Corporation, Kariya, Aichi-Pref (JP)

( * ) Notice: Subject to any disclaimer, the term of this patent is extended or adjusted under 35 U.S.C. 154(b) by 588 days.

(21) Appl. No.: 12/196,698

(22) Filed: Aug. 22, 2008

(65) Prior Publication Data

US 2009/0055068 A1 Feb. 26, 2009

(30) Foreign Application Priority Data

Aug. 24, 2007 (JP) .................. 2007-218738

(51) Int. Cl.
*G06G 7/00* (2006.01)
(52) U.S. Cl. ................. 701/69; 701/79; 701/90; 701/80
(58) Field of Classification Search ............. 701/69, 701/79, 80, 90
See application file for complete search history.

(56) References Cited

FOREIGN PATENT DOCUMENTS

JP 2004-017731 A 1/2004

*Primary Examiner* — Paul N Dickson
*Assistant Examiner* — Marlon A Arce
(74) *Attorney, Agent, or Firm* — Buchanan Ingersoll & Rooney PC

(57) ABSTRACT

A vehicle drive control device includes an initially determined request acceleration calculation means for calculating an initially determined request acceleration, an automatic drive control means for receiving the initially determined request acceleration and applying a predetermined torque to each wheel, a torque calculation means for calculating an allowable torque not causing a slip at each wheel when the allowable torque is applied thereto, on the basis of a vertical load applied to thereto and a friction coefficient of a road surface, a limit acceleration calculation means for calculating a limit acceleration acting on the vehicle in a case where the calculated allowable torque is applied to each wheel, and a request acceleration determination means for obtaining a request acceleration on the basis of the limit acceleration and the initially determined request acceleration, and for outputting the request acceleration, replacing the initially determined request acceleration, to the automatic drive control means.

9 Claims, 9 Drawing Sheets

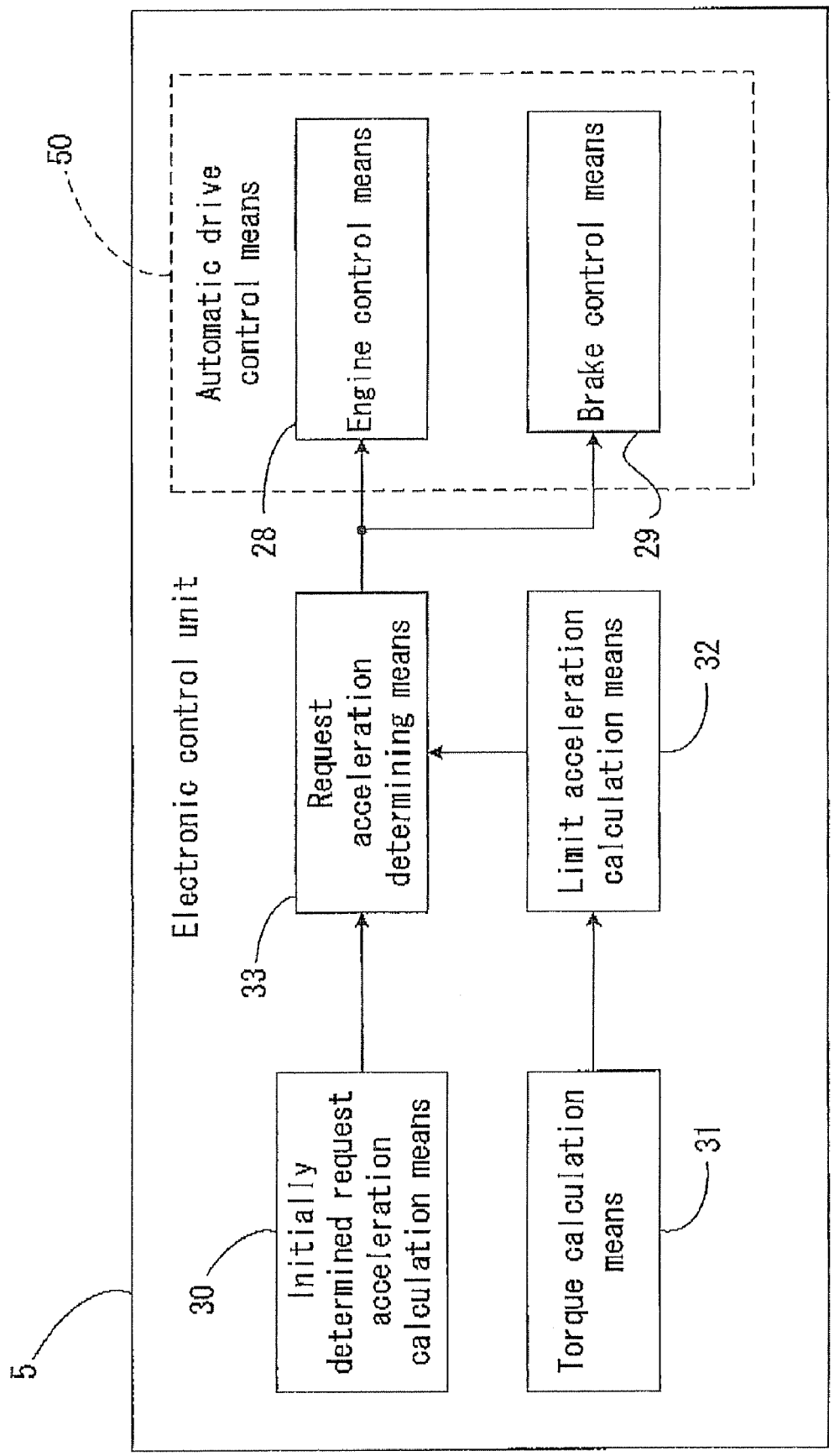

1

VEHICLE DRIVE CONTROL DEVICE

CROSS REFERENCE TO RELATED APPLICATIONS

This application is based on and claims priority under 35 U.S.C. §119 to Japanese Patent Application 2007-218738, filed on Aug. 24, 2007, the entire contents of which is incorporated herein by reference.

FIELD OF THE INVENTION

The present invention relates to a vehicle drive control device for automatically driving a vehicle while preventing an occurrence of a slip at each wheel.

BACKGROUND

Conventionally, a vehicle drive control device automatically drives a vehicle by executing, for example, a cruise control, by which the vehicle is driven so as to maintain a set vehicle speed without an acceleration operation conducted by a driver, or an adaptive cruise control (ACC), by which the vehicle is driven so as to maintain a predetermined distance from a vehicle traveling in front of the subject vehicle (hereinafter referred to as a leading vehicle) without the acceleration operation or a brake operation conducted by the driver.

For example, in a case where the vehicle travels a road surface having a low coefficient of friction (hereinafter referred to as a friction coefficient), a driving torque, a braking torque and the like for automatically driving the vehicle may become excessive, thereby causing a slip at each wheel of the vehicle. As a result, the conventional vehicle drive control device has disadvantages such that a driving state of the vehicle may become unstable, and the automatic drive of the vehicle may be forced to be cancelled due to an occurrence of the slip. In order to eliminate the drawback mentioned above, a vehicle drive control device disclosed in JP2004-17731A automatically drives a vehicle while preventing the occurrence of the slip when a road surface having a low friction coefficient exists in a prospective traveling route by calculating a limit vehicle speed, by which the occurrence of the slip is prevented, on the basis of the friction coefficient of the road, surface, and then decelerating the vehicle speed to the limit vehicle speed before the vehicle reaches the subject road surface.

Whether or not a slip occurs at a wheel is determined on the basis of a relationship between a friction coefficient of a road surface and a torque acted on the wheel. Therefore, the relationship between the friction coefficient of the road surface and the torque acting on the wheel is not taken into consideration in the case of the vehicle drive control device disclosed in JP2004-17731A that only restrains the vehicle speed. Hence, the vehicle drive control device disclosed in JP2004-17731A may not appropriately and surely restrain the occurrence of the slip.

A need thus exists for a vehicle drive control device which is not susceptible to the drawback mentioned above.

SUMMARY OF THE INVENTION

According to an aspect of the present invention, a vehicle drive control device includes an initially determined request acceleration calculation means for calculating an initially determined request acceleration for controlling a driving state of a vehicle, an automatic drive control means for receiving the initially determined request acceleration and applying a predetermined torque to each wheel of the vehicle on the basis of the inputted initially determined request acceleration in an automatic drive control, a torque calculation means for calculating an allowable torque not causing a slip at each wheel when the allowable torque is applied thereto, on the basis of a vertical load applied to each wheel and a friction coefficient of a road surface, a limit acceleration calculation means for calculating a limit acceleration acting on the vehicle in a case where the calculated allowable torque is applied to each wheel, and a request acceleration determination means for obtaining a request acceleration as an acceleration actually acting on the vehicle on the basis of the limit acceleration and the initially determined request acceleration, and for outputting the request acceleration, replacing the initially determined request acceleration, to the automatic drive control means.

BRIEF DESCRIPTION OF THE DRAWINGS

The foregoing and additional features and characteristics of the present invention will become more apparent from the following detailed description considered with the reference to the accompanying drawings, wherein:

FIG. 4 is a detailed block diagram illustrating an electronic control unit;

DETAILED DESCRIPTION

An embodiment of a vehicle drive control device related to the present invention will be described below in accordance with the attached drawings. In this embodiment, the term 'acceleration' used in an automatic drive control also includes negative acceleration caused by, for example, an engine braking which is associated with a drive torque.

[Brief Overview of the Invention]

In an automatic drive control, the vehicle control device applies a predetermined torque, which changes continuously and which is gained on the basis of an initially determined request acceleration for controlling a driving state of the vehicle, to each wheel, so that the vehicle control device automatically and stably drives the vehicle without causing a slip. The initially determined request acceleration is an acceleration determined in, for example, a cruise control or adaptive cruise control (ACC). In order to achieve such functions, in the automatic drive control, the vehicle drive control device calculates an allowable toque of each wheel on the basis of a vertical load applied thereto and a coefficient of friction (hereinafter referred to as a friction coefficient) of a road surface, and then calculates a limit acceleration for not causing the slip at each wheel in a case where an allowable torque is applied thereto. Then, the vehicle drive control device compares the limit acceleration and the initially determined request acceleration in order to gain a request acceleration not causing the slip at each wheel. The vehicle drive control device applies the predetermined torque calculated on the basis of the request acceleration, replacing the initially determined request acceleration, to each wheel of the vehicle.

The vehicle having the vehicle drive control device of the embodiment related to the present invention will be described below.

[Schematic Structure of Vehicle]

Figure 1:
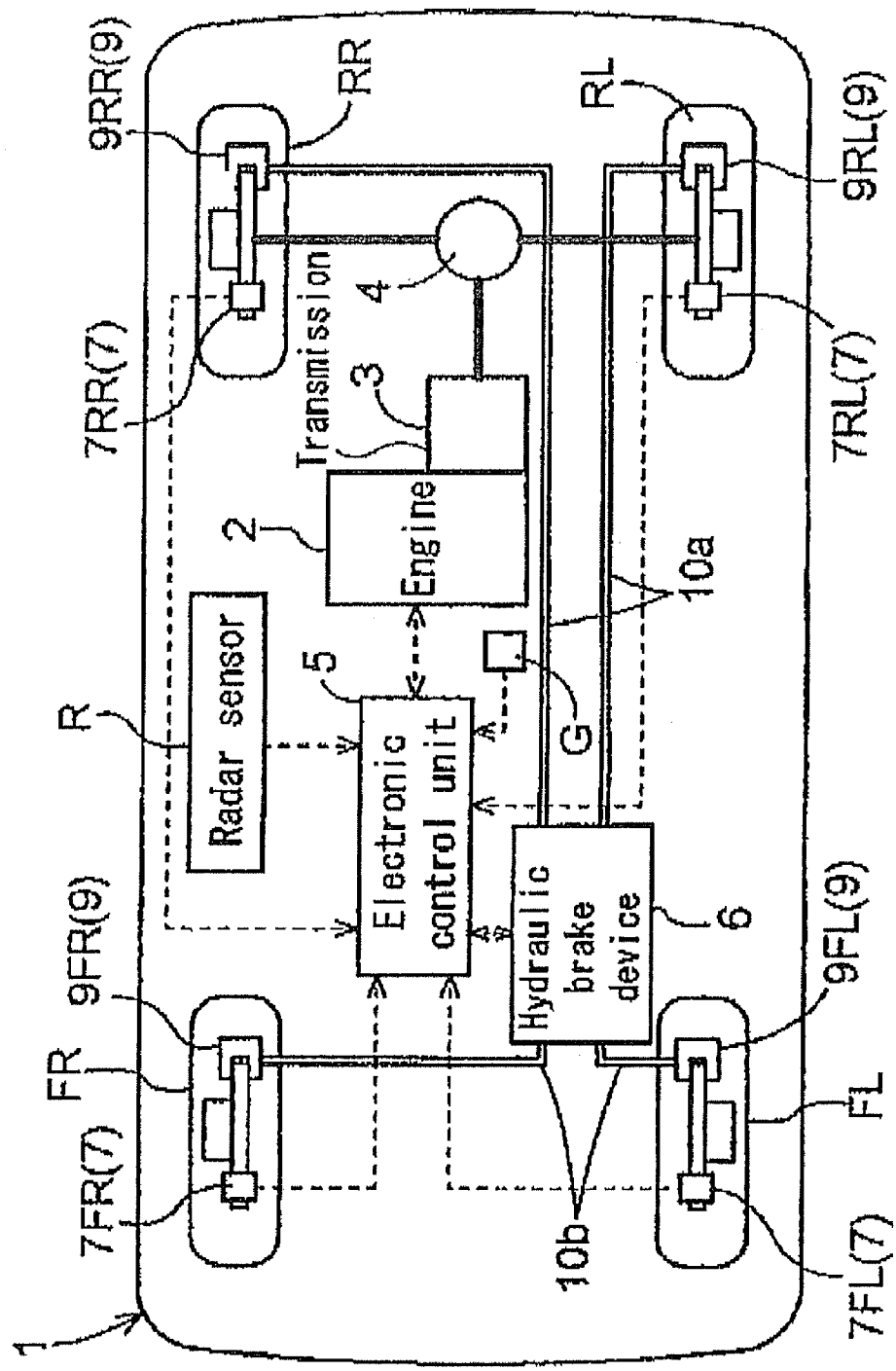
FIG. 1 is a view schematically illustrating a structure of a vehicle.

As illustrated in FIG. 1, a vehicle 1 includes four wheels FR, FL, RR and RL, an engine 2, a transmission 3, a differential device 4, an electronic control unit 5 and a hydraulic brake device 6. The vehicle drive control device of the embodiment corresponds to the electronic control unit 5. FR indicates a front-right wheel, FL indicates a front-left wheel, RR indicates a rear-right wheel and RL indicates a rear-left wheel. The vehicle 1 is configured in a rear-wheel-drive system in which an output of the engine 2 is transmitted to the rear-right wheel RR and the rear-left wheel RL via the transmission 3 and the differential device 4. The driving system is not limited to the rear-wheel-drive system of the embodiment, but the vehicle 1 may be configured to have a front-wheel-drive system, in which the front-right wheel FR and the front-left wheel FL are driven, or a four-wheel-drive system in which each of four wheels is driven.

The vehicle 1 is provided with wheel speed sensors 7 for detecting speed of the corresponding wheels (hereinafter referred to as wheel speeds). The wheel speed sensors 7 are configured with a front-right wheel speed sensor 7FR corresponding to the front-right wheel FR, a front-left wheel speed sensor 7FL corresponding to the front-left wheel FL, a rear-right wheel speed sensor 7RR corresponding to the rear-right wheel RR, and a rear-left wheel speed sensor 7RL corresponding to the rear-left wheel RL, so that speed of each wheel is individually detected by the corresponding wheel speed sensor 7. Further, the vehicle 1 is provided with an acceleration sensor G for detecting acceleration in a front-rear direction of the vehicle 1, and a radar sensor R for detecting a distance between the vehicle 1 and a vehicle traveling in front of the vehicle 1 (hereinafter referred to as a leading vehicle).

[Configuration of Hydraulic Brake Device]

Figure 2:
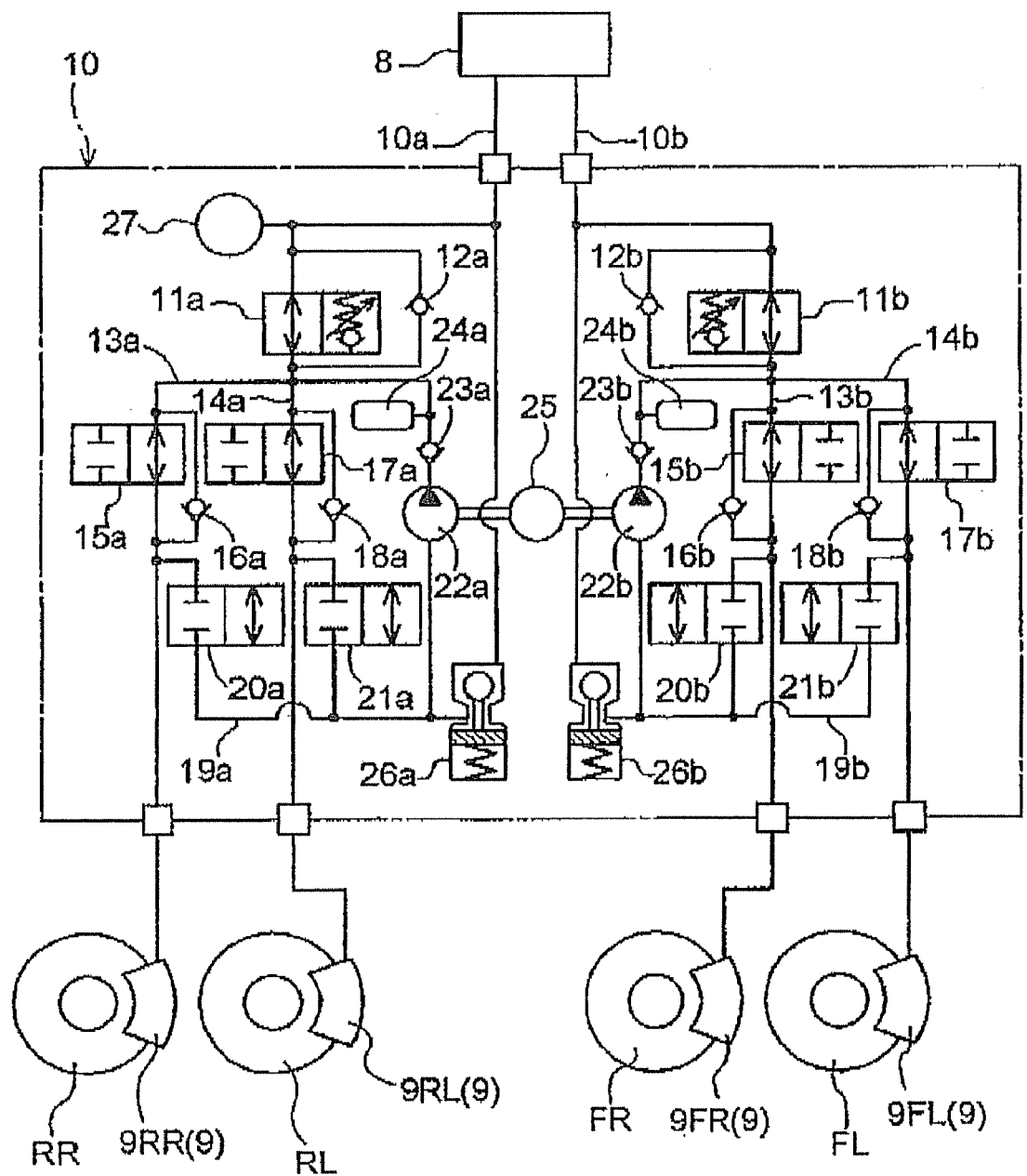
FIG. 2 is a view illustrating a configuration of the hydraulic brake device.

A configuration of the hydraulic brake device 6 will be described below with reference to FIG. 2. The hydraulic brake device 6 includes a master cylinder 8 for generating a master cylinder hydraulic pressure in response to a brake operating force applied by a driver, and a hydraulic circuit 10 for transmitting the master cylinder hydraulic pressure to a wheel cylinder 9 of each of the wheels FR, FL, RR and RL. The wheel cylinders 9FR, 9FL, 9RR and 9RL are provided at the corresponding wheels FR, FL, RR and RL.

The master cylinder 8 is formed in a tandem-type cylinder having two hydraulic pressure chambers (not shown). The master cylinder 8 generates the master cylinder hydraulic pressure by a force generated by boosting the brake operating force at a booster (not show). Further, the master cylinder 8 is provided with a master cylinder reservoir (not shown) for supplying a brake fluid and reserving surplus brake fluid.

The hydraulic circuit 10 is formed with a first hydraulic circuit 10a for establishing fluid communication between one of the hydraulic pressure chambers of the master cylinder 8 and the rear-right wheel cylinder 9RR of the rear-right wheel RR and the rear-left wheel cylinder 9RL of the rear-left wheel RL, and a second hydraulic circuit 10b for establishing the fluid communication between the other hydraulic pressure chamber of the master cylinder 8 and the front-right wheel cylinder 9FR of the front-right wheel FR and the front-left wheel cylinder 9FL of the front-left wheel FL.

The first hydraulic circuit 10a is provided with a linear control valve 11a that changes a fluid communication state. A check valve 12a for the master cylinder 8 (hereinafter referred to as a master cylinder check valve 12a), which allows a flow of the brake fluid from the master cylinder 8 to the wheel cylinders 9 and inhibits the flow of the brake fluid from the wheel cylinders 9 to the master cylinder 8, is provided at the first hydraulic circuit 10a so as to be arranged la parallel to the linear control valve 11a. The master cylinder check valve 12a is configured to allow the flow of the brake fluid from the master cylinder 8 to the wheel cylinders 9 in order to apply the master cylinder hydraulic pressure to the wheel cylinders 9, even if the linear control valve 11a is in a fluid communication interrupting state. The fluid communicating state refers to a state where the flow of the brake fluid between the master cylinder and the wheel cylinders 9 is established. The fluid communication interrupting state refers to a state where the flow of the brake fluid between the master cylinder and the wheel cylinders 9 is interrupted.

The first fluid circuit 10a is diverged into a first branch hydraulic circuit 13a and a second branch hydraulic circuit 14a at a downstream side closer to the wheel cylinders 9 than the linear control valve 11a. The first branch hydraulic circuit 13a is connected to the rear-right wheel cylinder 9RR and the second branch hydraulic circuit 14a is connected to the rear-left wheel cylinder 9RL. A first normally-open-control valve 15a (a NO valve 15a), which is switchable into two positions (i.e. a fluid communicating position and a fluid communication interrupting position), is provided at the first branch hydraulic circuit 13a. When the normally-open-control valve 15a is at the fluid communicating position, the flow of the brake fluid between the master cylinder 8 and the rear-right wheel cylinder 9RR is established. When the normally-open-control valve 15a is at the fluid communication interrupting position, the flow of the brake fluid between the master cylinder and the rear-right wheel cylinder 9RR is interrupted. A first check valve 16a, that allows the flow of the brake fluid from the rear-right wheel cylinder 9RR to the master cylinder 8 and inhibits the flow of the brake fluid from the master cylinder 8 to the rear-right wheel cylinder 9RR, is arranged in parallel to the first normally-open-control valve 15a. Similarly, the second branch hydraulic circuit 14a is provided with a second normally-open-control valve 17a corresponding to the first normally-open-control valve 15a, and a second check valve 18a corresponding to the first check valve 16a.

The first hydraulic circuit 10a includes a branch connecting circuit 19a that connects a fluid passage, diverged from the first branch hydraulic circuit 13a at the downstream side closer to the rear-right wheel cylinder 9RR than the first normally-open-control valve 15a, and a fluid passage diverged from the second branch hydraulic circuit 14a at the downstream side closer to the rear-left wheel cylinder 9RL than the second normally-open-control valve 17a. A first normally-closed-control valve 20a (a NC valve 20a), which is switchable into two positions (i.e. the fluid communicating position and the fluid communication interrupting position), is provided at the fluid passage diverged from the first branch hydraulic circuit 13a in the branch connecting circuit 19a. Similarly, a second normally-closed-control valve 21a, which is switchable into two positions (i.e. the fluid communicating position and the fluid communication interrupting position), is provided at the fluid passage diverged from the second branch hydraulic circuit 14a in the branch connecting circuit 19a. The branch connecting circuit 19a further extends to be connected at a point between the linear control valve 11a and the first and second normally-open-control valves 15a and 17a in the first hydraulic circuit 10a. A hydraulic pump 22a, a third check valve 23a and a dumper 24a are provided at the branch connecting circuit 19a in this order at the circuit extending to the point between the linear control valve 11a in the first hydraulic circuit 10a and the first and second normally-open-control valves 15a and 17a from a point where the flow of the brake fluid from the rear-right wheel cylinder 9RR becomes confluent with the fluid of the brake fluid from the rear-left wheel cylinder 9RL. More specifically, the hydraulic pump 22a is provided closer to the wheel cylinders 9 at the branch connecting circuit 19a than the third check valve 23a and the damper 24a, the third check valve 23a is provided closer to the liner control valve 11a than the hydraulic pump 22a, and the damper 24a is provided closest to the liner control valve 11a at the branch connecting circuit 19a. The hydraulic pump 22a is configured to be rotatably driven by a motor 25 and to pressurize the brake fluid into a predetermined pressure and then discharge the pressurized brake fluid. A reservoir 26a is provided at the branch connecting circuit 19a between the first and second normally-closed-control valves 20a, 21a and the hydraulic pump 22a. The reservoir 26a is connected between the master cylinder 8 and the linear control valve 11a in the first hydraulic circuit 10a.

The first hydraulic circuit 10a in the hydraulic circuit 10 is described above. The second hydraulic circuit 10b is configured substantially the same as the first hydraulic circuit 10a, and the second hydraulic circuit 10b is provided with the similar portions as the portions provided at the first hydraulic circuit 10a. More specifically, a liner control valve 11b, a first normally-open-control valve 15b, a second normally-open-control valve 17b, a first normally-closed-control valve 20b, a second normally-closed-control valve 21b, a hydraulic pump 22b and the like are provided at the second hydraulic circuit 10b. A letter 'a' is added after an Arabic numeral indicating a portion provided at the first hydraulic circuit 10a, and a letter 'b' is added after an Arabic numeral indicating a portion provided at the second hydraulic circuit 10b, in order to indicate the identical portion. Hereinafter, in a case to indicate an identical portion provided at both of the first and the second hydraulic circuits 10a and 10b, the letters 'a' and 'b' after the Arabic numeral will be omitted.

The motor 25, according to the embodiment, includes a single motor which is configured to rotatably drive the hydraulic pump 22a provided at the first hydraulic circuit 10a and the hydraulic pump 22b provided at the second hydraulic circuit 10b. A hydraulic pressure sensor 27 for detecting the master cylinder hydraulic pressure (hereinafter referred to as a master cylinder hydraulic pressure sensor 27) is provided at the hydraulic circuit 10. In this embodiment, the master cylinder hydraulic pressure sensor 27 is provided at the first hydraulic circuit 10a. However, the master cylinder hydraulic pressure sensor 27 may be provided at the second hydraulic circuit 10b, instead of providing the master cylinder hydraulic pressure sensor 27 at the first hydraulic circuit 10a.

[Configuration of Vehicle Control]

Figure 3:
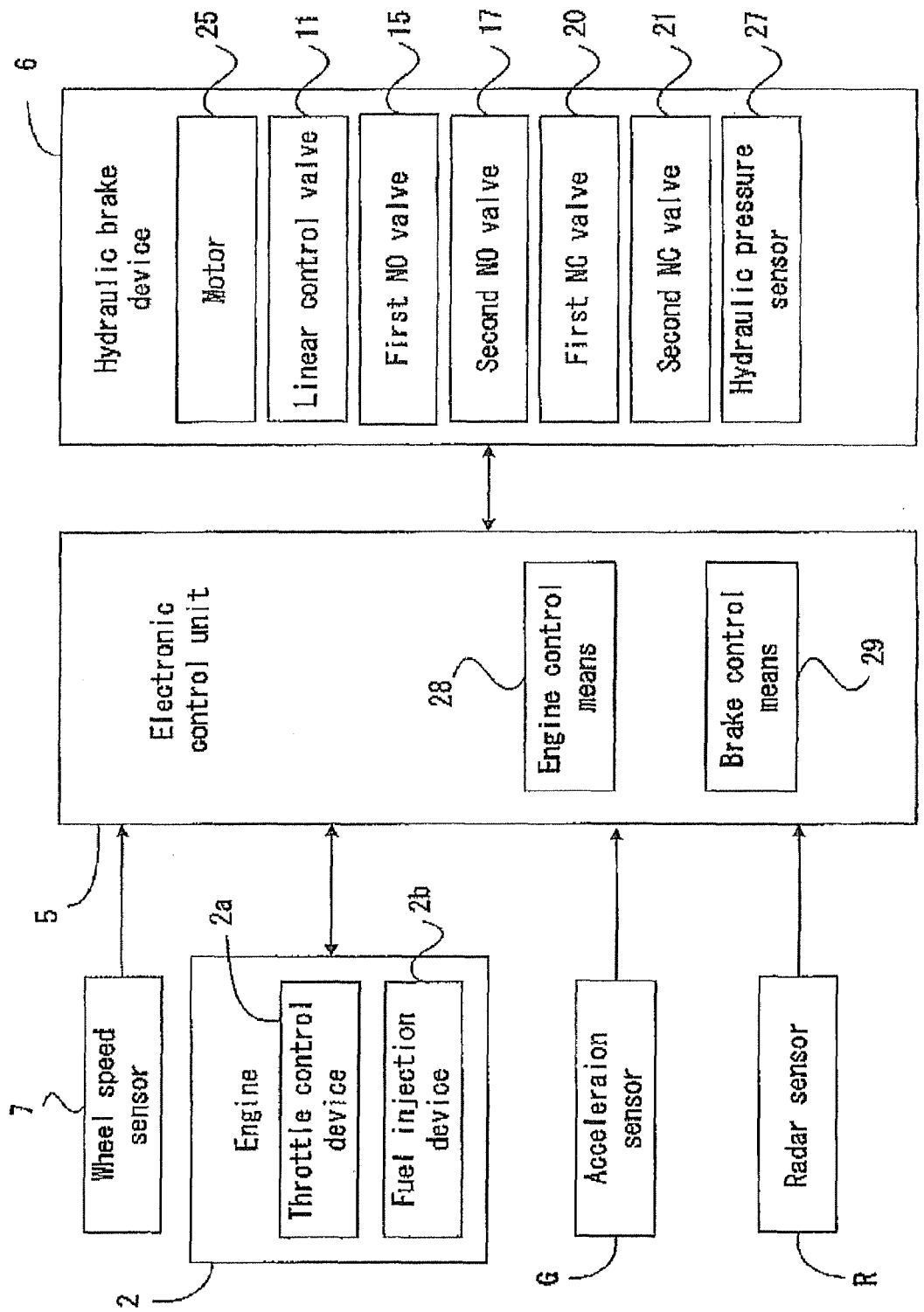
FIG. 3 is a block diagram illustrating a configuration of a vehicle control.

A configuration, of a vehicle control will be described below in accordance with FIG. 3. The electronic control unit 5 is configured with a microcomputer including a central processing unit (CPU), a read-only memory (ROM), a random access memory (TRAM) and an input-output portion. The electronic control unit 5 is configured so that detecting signals of each sensor such as the wheel speed sensors 7, the acceleration sensor G, the radar sensor R, the master cylinder hydraulic pressure sensor 27 and the like are inputted thereto. The electronic control unit 5 includes an engine control means 28 for controlling an operation of the engine 2, and a brake control means 29 for controlling an operation of the hydraulic brake device 6. The engine control means 28 calculates a throttle opening degree, a fuel injection quantity and the like for outputting a request driving torque, and then controls operations of a throttle control device 2a and a fuel injection device 2b provided at the engine 2. The throttle control device 2a controls the throttle opening degree of the engine 2. The fuel injection device 2b controls the fuel injection quantity of the engine 2.

The brake control means 29 automatically controls the operation of the hydraulic brake device 6 so as to apply a request braking torque to each wheel, without being influenced by the brake operation conducted by the driver. Further, the brake control means 29 is configured to freely and individually apply the request, braking toque to each wheel by controlling an operation of each of the liner control valve 11, the first normally-open-control valve 15, the second normally-open-control valve 17, the first normally-closed-control valve 20, the second normally-closed-control valve 21 and the motor 25.

A case where the request braking torque is applied to the rear-right wheel RR will be described below as an example, in accordance with FIG. 2. In order to increase a wheel cylinder pressure, the brake control means 29 activates the motor 25, controls the liner control valve 11a to be in the fluid communication interrupting state, controls the first normally-open-control valve 15a to be at the fluid communicating position, and controls the first normally-closed-control valve 20a to be at the fluid communication interrupting position. In order to maintain the wheel cylinder pressure, the brake control means 29 controls the liner control valve 11a to be in the fluid communication interrupting state, switches the first normally-open-control valve 15a to be at the fluid communication interrupting position, and controls the first normally-closed-control valve 20a to be at the fluid communication interrupting position.

[Automatic Drive Control]

The automatic drive control for automatically driving the vehicle 1 will be described below. For example, the vehicle 1 is automatically driven by the electronic control unit 5 executing the automatic drive control such as a cruise control for driving the vehicle at a constant preset speed without involving an acceleration operation conducted by the driver, and an adaptive cruise control (ACC) for driving the vehicle while maintaining a predetermined distance between the vehicle 1 and the leading vehicle without involving the acceleration operation and the brake operation conducted by the driver. As illustrated in FIG. 4, the electronic control unit 5 includes an initially determined request acceleration calculation means 30, a torque calculation means 31, a limit acceleration calculation means 32, a request acceleration determination means 33 and an automatic drive control means 50 for executing the automatic drive control.

The initially determined request acceleration calculation means 30 calculates the initially determined request acceleration for controlling the driving state of the vehicle 1, and outputs the initially determined request acceleration to the request acceleration determination means 33. The torque calculation means 31 calculates the allowable torque, which is a torque not causing a slip at the wheel when the torque is applied thereto, for each wheel, and outputs the allowable torque of each wheel to the limit acceleration calculation means 32. The limit acceleration calculation means 32 calculates the limit acceleration actable on the vehicle 1 when the calculated allowable torques are applied to the corresponding wheels, and outputs the limit acceleration to the request acceleration determination means 33. The request acceleration determination means 33 calculates the request acceleration as an acceleration actually acting on the vehicle 1 on the basis of the limit acceleration and the initially determined request acceleration, and outputs the request acceleration, replacing the initially determined request acceleration, to the automatic drive control means 50. The automatic drive control means 50 receives the request acceleration and applies a predetermined torque to each wheel of the vehicle 1 on the basis of the inputted request acceleration in the automatic drive control of the vehicle 1.

The vertical load applied to each wheel, the friction coefficient of the road surface and the allowable torque of each wheel are taken into consideration in the limit acceleration calculated by the limit acceleration calculation means 32. The request acceleration determination means 33 does not output the initially determined request acceleration to the automatic drive control means 50, but compares the limit acceleration and the initially determined request acceleration in order to obtain the request acceleration not causing the slip, which is caused by the acceleration acting on the vehicle 1, at each wheel. Then, the request acceleration determination means 33 replaces the initially determined request acceleration with the obtained request acceleration, and outputs the replaced request acceleration to the automatic drive control means 50. The automatic drive control means 50 applies the predetermined torque to each wheel of the vehicle on the basis of the request acceleration. Hence, the torque based on the request acceleration not causing the slip at each wheel is applied to each wheel. As a result, the vehicle 1 is stably and automatically driven while preventing an occurrence of the slip at each wheel.

In the cruise control, the initially determined request acceleration calculation means 30 calculates the initially determined request acceleration on the basis of a difference between a current vehicle body speed and the set vehicle body speed so as to maintain the set vehicle body speed. For example, an average speed of the wheel speeds individually detected by the corresponding four wheel speed sensors 7 may be defined as the current vehicle body speed. In the ACC, the initially determined request acceleration calculation means 30 calculates the initially determined request acceleration on the basis of a relative velocity and the like between the subject vehicle and the leading vehicle so as to maintain the distance therebetween to be constant. The distance between the subject vehicle and the leading vehicle may be calculated from a detection signal of the radar sensor R. The relative velocity between the subject vehicle and the leading vehicle may be calculated by differentiating the distance therebetween with respect to time.

The torque calculation means 31 calculates the allowable torque of each wheel on the basis of the vertical load applied to each wheel in response to a road surface gradient, and the friction coefficient of the road surface. The torque calculation means 31 calculates the allowable torque by using, for example, the following equation (equation 1).

$$T = \mu \times N1 \times P \qquad \text{Equation 1:}$$

where T indicates the allowable torque, $\mu$ indicates the friction coefficient of the road surface, N1 indicates the vertical load applied to the wheel in response to the road surface gradient, and P indicates a radius of the wheel.

The limit acceleration calculation means 32 calculates the limit acceleration, which does not cause the slip at any wheels, on the basis of the allowable torques of the four wheels and the road surface gradient. For example, the limit acceleration calculation means 32 preliminarily stores a relational expression, obtained by an experimental test and the like, for modifying a relationship between a sum of the allowable torques of the four wheels and the limit acceleration, in response to the road surface gradient. The limit acceleration calculation means 32 calculates the limit acceleration by suing the relational expression.

The request acceleration determination means 33 is configured to compare the initially determined request acceleration and the limit acceleration, and determine the initially determined request acceleration as the request acceleration in a case where the initially determined request acceleration is equal to or lower than the limit acceleration, or determine the limit acceleration as the request acceleration in a case where the initially determined request acceleration is greater than the limit acceleration. For example, assuming that the limit acceleration is $-1.0$ m/s$^2$ and the initially determined request acceleration is $-0.8$ m/s$^2$ when the vehicle 1 is decelerated, the request acceleration determination means 33 determines (sets) the initially determined request acceleration ($-0.8$ m/s$^2$) as the request acceleration. On the other hand, assuming that the limit acceleration is $-1.0$ m/s$^2$ and the initially determined request acceleration is $-1.2$ m/s$^2$ when the vehicle 1 is decelerated, the request acceleration determination means 33 determines the limit acceleration ($-1.0$ m/s$^2$) as the request acceleration. In practice, in the case where the limit acceleration is determined as the request acceleration, an acceleration, which is greater than the limit acceleration by a predetermined amount, is determined as the request acceleration.

The automatic drive control means 50 is configured by the engine control means 28 and the brake control means 29. The engine control means 28 calculates the request driving torque in response to the request acceleration and controls the operation of the engine 2 so as to apply the calculated request driving torque to the wheels. The brake control means 29 calculates the request braking torque in response to the request acceleration, and controls the operation of the hydraulic brake device 6 so as to apply the calculated request braking torque to the wheels. The automatic drive control means 50 executes a feedback calculation for calculating an adjustment amount of the acceleration on the basis of a deviation between the inputted request acceleration and a current acceleration, then the automatic drive control means 50 calculates the request driving torque and the request braking torque in response to the calculated adjustment amount of the acceleration. The current acceleration may be calculated by differentiating the current vehicle speed with respect to time.

As described above, in the case where the torque is applied to each wheel in response to the request acceleration, the feedback calculation for calculating the adjustment amount of the acceleration on the basis of the deviation between the request acceleration and the current acceleration is executed. If a rate of change of the request acceleration is high in a case where the feedback calculation is executed, a so-called overshoot, i.e. a phenomenon where the acceleration actually acting on the vehicle exceeds the limit acceleration, may occur. When the overshoot occurs, the torque applied to each wheel exceeds the allowable torque, thereby causing the slip at each wheel. Hence, the request acceleration determination means 33 of the embodiment is configured to determine an allowable acceleration changing rate so that the torque applied to each wheel by the automatic drive control means 50 falls within a predetermined range, and to output the calculated request acceleration to the automatic drive control means 50 on the basis of the determined allowable acceleration changing rate. The predetermined range is determined on the basis of a range within which the slip is not occurred at each wheel when the torque is applied thereto. As described above, the request acceleration determination means 33 not only outputs the calculated request acceleration to the automatic drive control means 50, but also outputs the determined allowable acceleration changing rate to the automatic drive control means 50. Therefore, the automatic drive control means 50 applies the torque to each wheel while preventing the adjustment amount of the acceleration, obtained by the feedback calculation, from being over-increased and controlling the acceleration acting on the vehicle to be lower than the limit acceleration. As a result, reliability of the feedback calculation is increased, and the occurrence of the slip at each wheel is surely prevented.

Figure 5A:
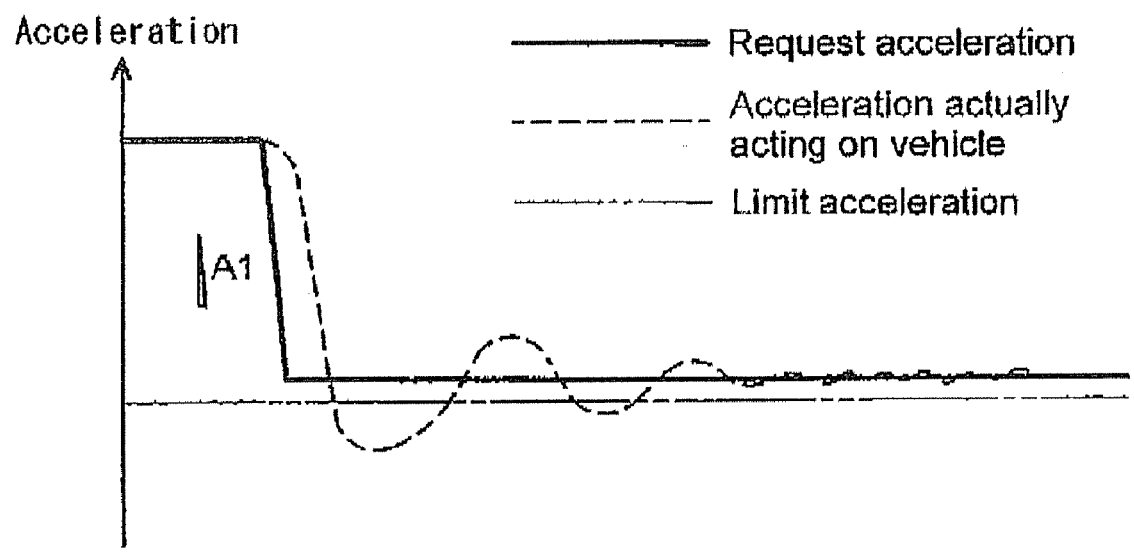
FIG. 5 is a graph showing a changing rate of acceleration in a case where request acceleration is applied.
Figure 5B:
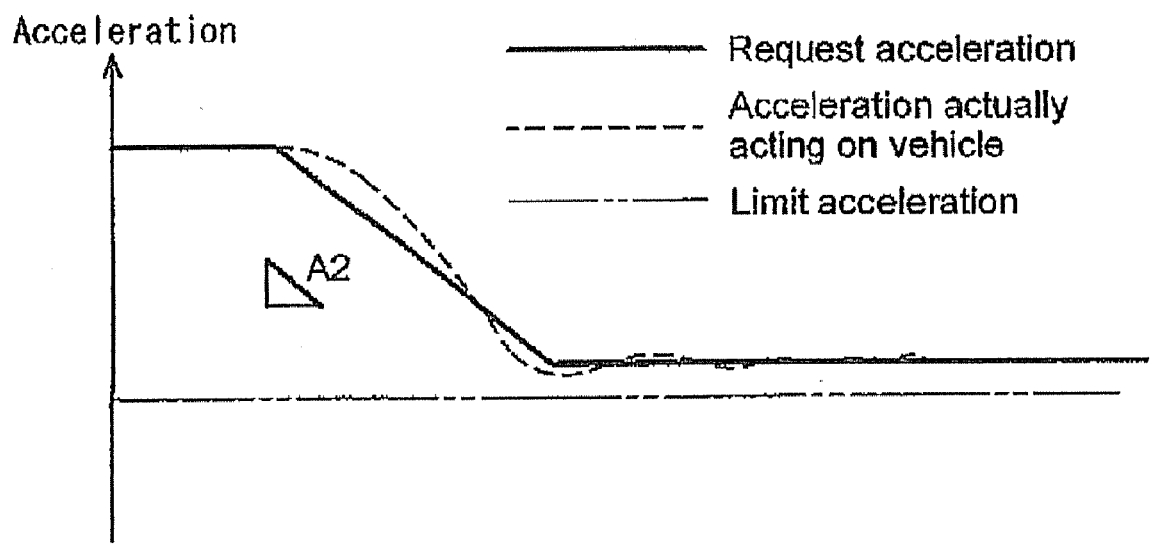

A changing rate of the acceleration when the request acceleration is acted on the vehicle 1 will be described below in accordance with FIG. 5. The acceleration actually acting on the vehicle 1 in the case where the vehicle 1 is decelerated is indicated with a dashed line. The request acceleration in the case where the vehicle 1 is decelerated is indicated with a solid line as the acceleration, which is obtained by taking the predetermined set acceleration (the predetermined amount) into consideration in the limit acceleration. As indicated by the solid line in FIG. 5A, if a changing rate A1 of the request acceleration is high, the acceleration, actually acting on the vehicle 1 and illustrated by the dashed line, greatly overshoots the request acceleration. As a result, the acceleration actually acting on the vehicle 1 exceeds the limit acceleration, and the torque applied to each wheel exceeds the predetermined range within which the slip is not caused at the wheels. On the other hand, as indicated by a dashed line and the solid line in FIG. 5B, in a case where a changing rate A2 of the request acceleration is low, an amount of the acceleration actually acting on the vehicle 1 overshooting the request acceleration is reduced. Hence, the acceleration actually acting on the vehicle 1 does not exceed the limit acceleration. Therefore, the request acceleration determination means 33 calculates and determines the allowable acceleration changing rate (e.g. A2) by which the acceleration actually acting on the vehicle 1 does not exceed the limit acceleration so that the torque applied to each wheel by the automatic drive control means 50 falls within die predetermined range.

Figure 6:
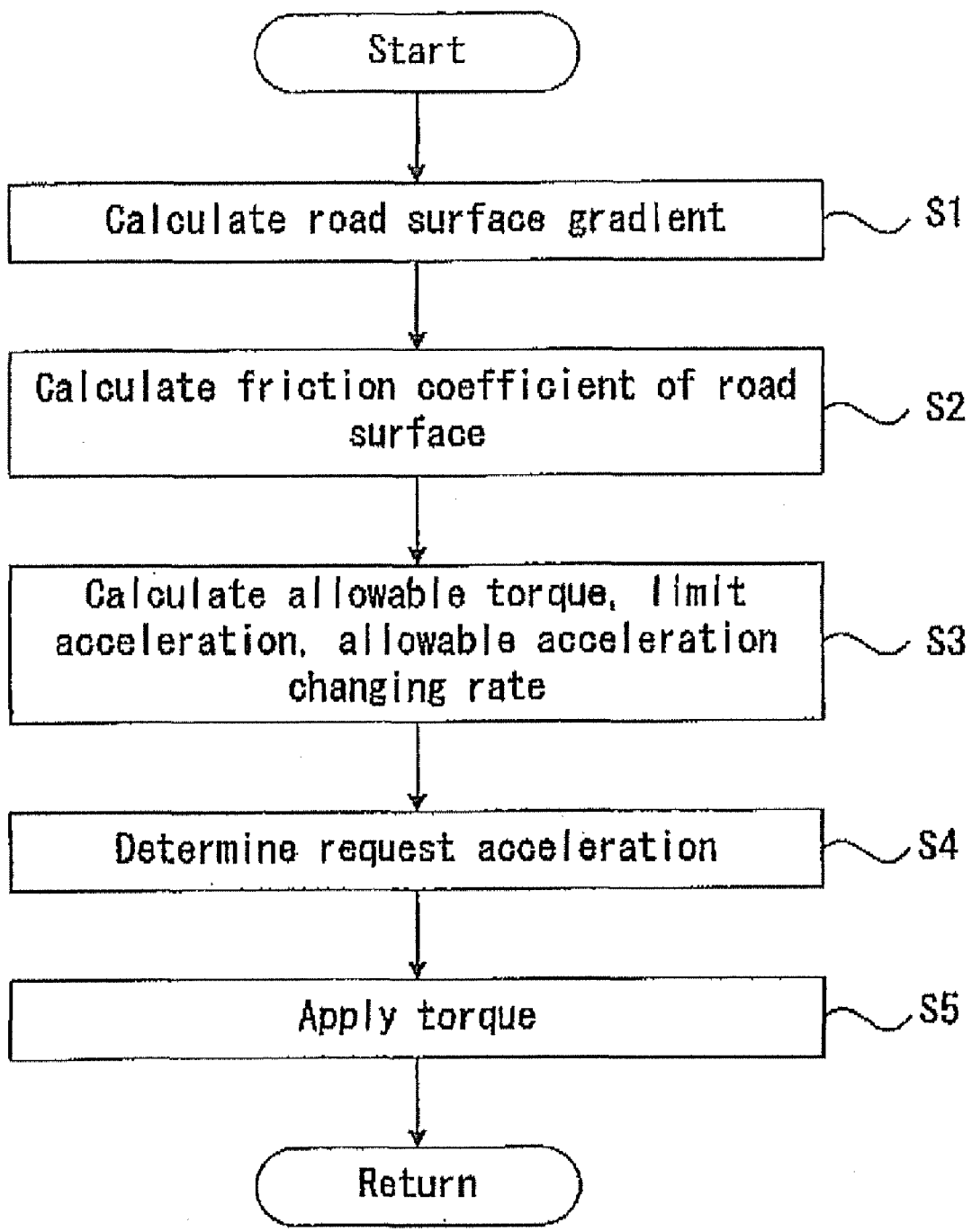
FIG. 6 is a flowchart showing a process executed in a case where the vehicle is automatically driven.

A processing operation of the electronic control unit 5 in the automatic drive control will be described below in accordance with FIG. 6. In the automatic drive control, the initially determined request acceleration calculation means 30 calculates the initially determined request acceleration while executing an operation illustrated in a flowchart in FIG. 6. The operation illustrated in FIG. 6 is repeatedly executed at a set cycle in the automatic drive control.

The electronic control unit 5 executes processes of calculating the road surface gradient and the friction coefficient of the road surface (step S1, S2). The electronic control unit 5 executes a process of calculating the allowable torque of each wheel, the limit acceleration and the allowable acceleration changing range at the torque calculation means 31, the limit acceleration calculation means 32 and the request acceleration determination means, respectively (step S3). The electronic control unit 5 executes a process of determining the request acceleration by comparing the initially determined request acceleration and the limit acceleration at the request acceleration determination means 33 (step S4). The electronic control unit 5 executes a process of calculating the request driving torque and the request braking torque at the engine control means 28 and the brake control means 29, respectively, and executes a process of applying the torque to each wheel while controlling the operations executed by the engine 2 and the hydraulic brake device 6 so as to apply the calculated request driving torque and the request brake torque to each wheel (step S5).

Figure 7:
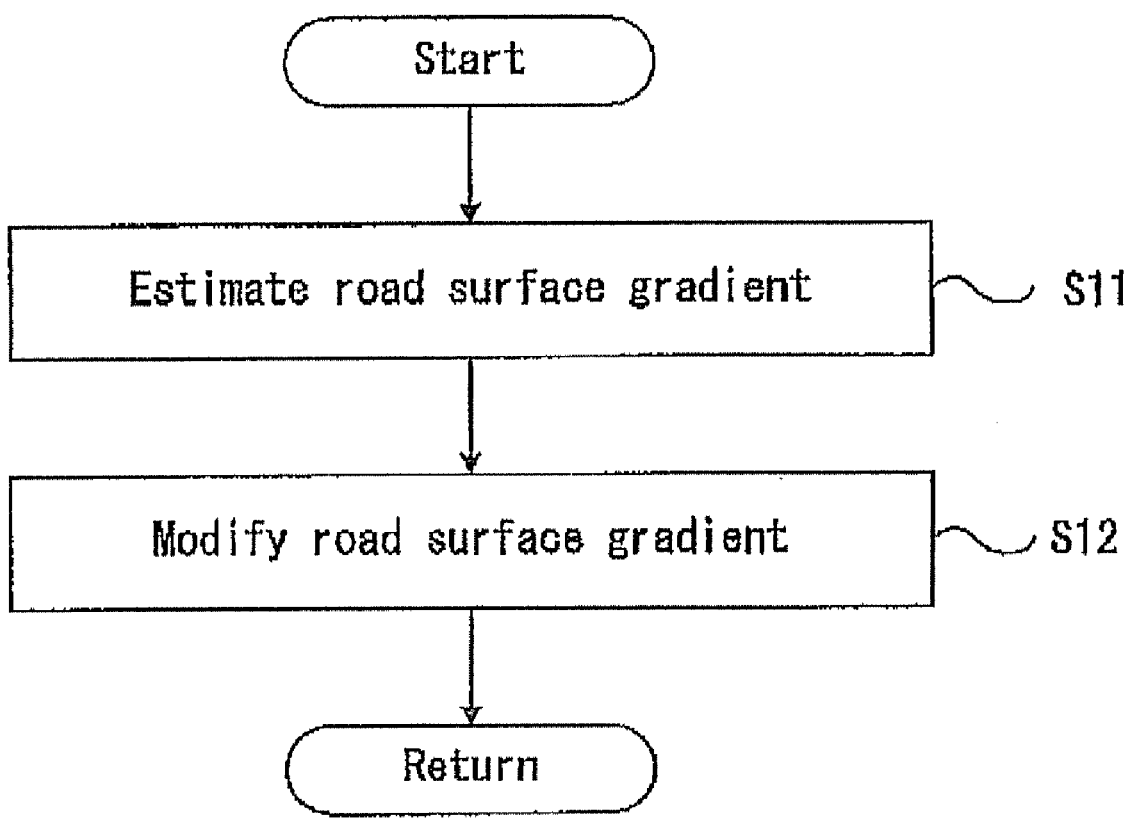
FIG. 7 is a flowchart showing a process of calculating a road surface gradient.

The process of calculating the road surface gradient executed at step S1 in FIG. 6 will be described in detail below in accordance with a flowchart illustrated in FIG. 7. The electronic control unit 5 estimates the road surface gradient on the basis of a value obtained by differentiating the current vehicle body speed with respect to time and the acceleration detected by the acceleration sensor G (step S11). The electronic control unit 5 modifies the estimated road surface gradient on the basis of information for modifying the road surface gradient (step S12). The information for modifying the road surface gradient includes, for example, information on the road surface gradient obtained by a car navigation system, a global positioning system (GPS) and the like.

The process of calculating the friction coefficient of the road surface executed at step S2 in FIG. 6 will be described in detail below in accordance with a flowchart illustrated in FIG. 8. The electronic control unit 5 determines whether or not a friction coefficient $\mu$ of the road surface is stored therein (step S21), and whether or not memory retention time for retaining the memory of the friction coefficient $\mu$ of the road surface has passed (step S22). The electronic control unit 5 clears the stored friction coefficient $\mu$ of the road surface when the electronic control unit 5 stores the friction coefficient $\mu$ of the road surface and the memory retention time has passed (step S23).

The electronic control unit 5 determines whether a wheel torque acting on each of the driving wheels is positive or negative (step S24), and when the wheel torque is determined as negative, the electronic control unit 5 determines whether or not a deceleration slip occurs (step S25). The electronic control unit 5 determines whether or not an acceleration slip occurs when the wheel torque of the driving wheel is positive (step S24, S26). The electronic control unit 5 determines that the acceleration slip occurs when the wheel speed detected by the corresponding wheel speed sensor 7 exceeds a value obtained by adding a speed corresponding to a predetermined slip ratio (i.e. a predetermined slip amount) to the vehicle body speed. The electronic control unit 5 determines that the deceleration slip occurs when the wheel speed detected by the corresponding wheel speed sensor 7 is lower than a value obtained by subtracting the speed corresponding to the predetermined slip ratio (i.e. the predetermined slip amount) from the vehicle body.

When the electronic control unit 5 determines that either the deceleration slip or the acceleration slip occurs, the electronic control unit 5 calculates and stores the friction coefficient $\mu$ of the road surface on the basis of the wheel torque and the vertical load applied to the wheel when the deceleration slip or the acceleration slip occurs, by using the following equation (equation 2) (step S27). The electronic control unit 5 sets the memory retention time of the friction coefficient $\mu$ of the road surface on the basis of ambient temperature, regional weather information and the like (step S28), and then modifies the set memory retention time on the basis of the information for modifying the memory retention time. The information for modifying the memory retention time includes, for example, information obtained by an inter-vehicle communication between the subject vehicle and the vehicles traveling in front of the subject vehicle and information obtained by a road-to-vehicle communication such as a road information monitor and the like. The electronic control unit 5 modifies the memory retention time to be extended or shortened on the basis of the above-mentioned information.

$$\mu = T1/(P \times N2) \quad \text{Equation 2:}$$

where μ indicates the friction coefficient of the road surface, T1 indicates the torque acting on the wheels when the acceleration slip or the deceleration slip occurs thereat, P indicates the radius of the wheel and N2 indicates the vertical load applied to the wheel when the acceleration or the deceleration slip occurs. The torque acting on the wheel when the acceleration slip occurs corresponds to the request driving torque, and may be calculated on the basis of an output torque of the engine 2, a gear ratio of the transmission and the like. The torque acting on the wheel when the deceleration slip occurs corresponds to the request braking torque applied to the wheel and may be calculated on the basis of the corresponding wheel cylinder pressure of the wheel.

Figure 8:
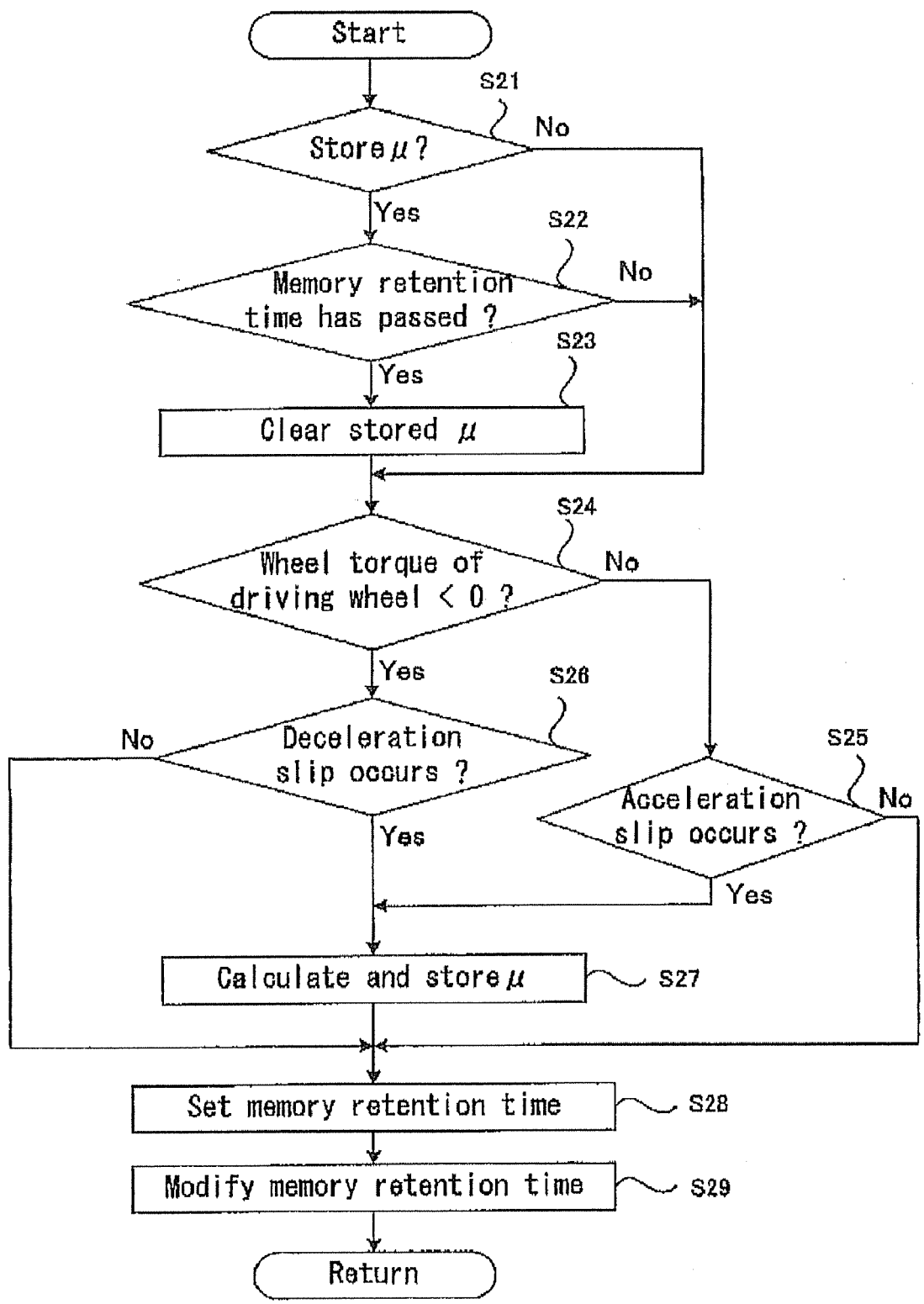
FIG. 8 is a flowchart showing a process of calculating a friction coefficient of the road surface.

In the process illustrated, in FIG. 8, the memory of the friction coefficient μ of the road surface is retained until the memory retention time has passed. Alternatively, for example, a memory retention traveling distance for retaining the memory of the friction coefficient μ of the road surface may be set, and the electronic control unit 5 retains the memory of the friction coefficient μ of the road surface until the traveling distance of the vehicle, since the friction coefficient μ of the road surface is stored, reaches the memory retention traveling distance. Further, in the process illustrated in FIG. 8, the friction coefficient μ of the road surface is calculated on the basis of the wheel torque and the vertical load applied to the wheel when the deceleration slip or the acceleration slip occurs thereat. Alternatively, the friction coefficient μ of the road surface may be calculated on the basis of the wheel torque and an average value of the vertical loads applied to the wheels while the deceleration slip or the acceleration slip occurs thereat.

Figure 9:
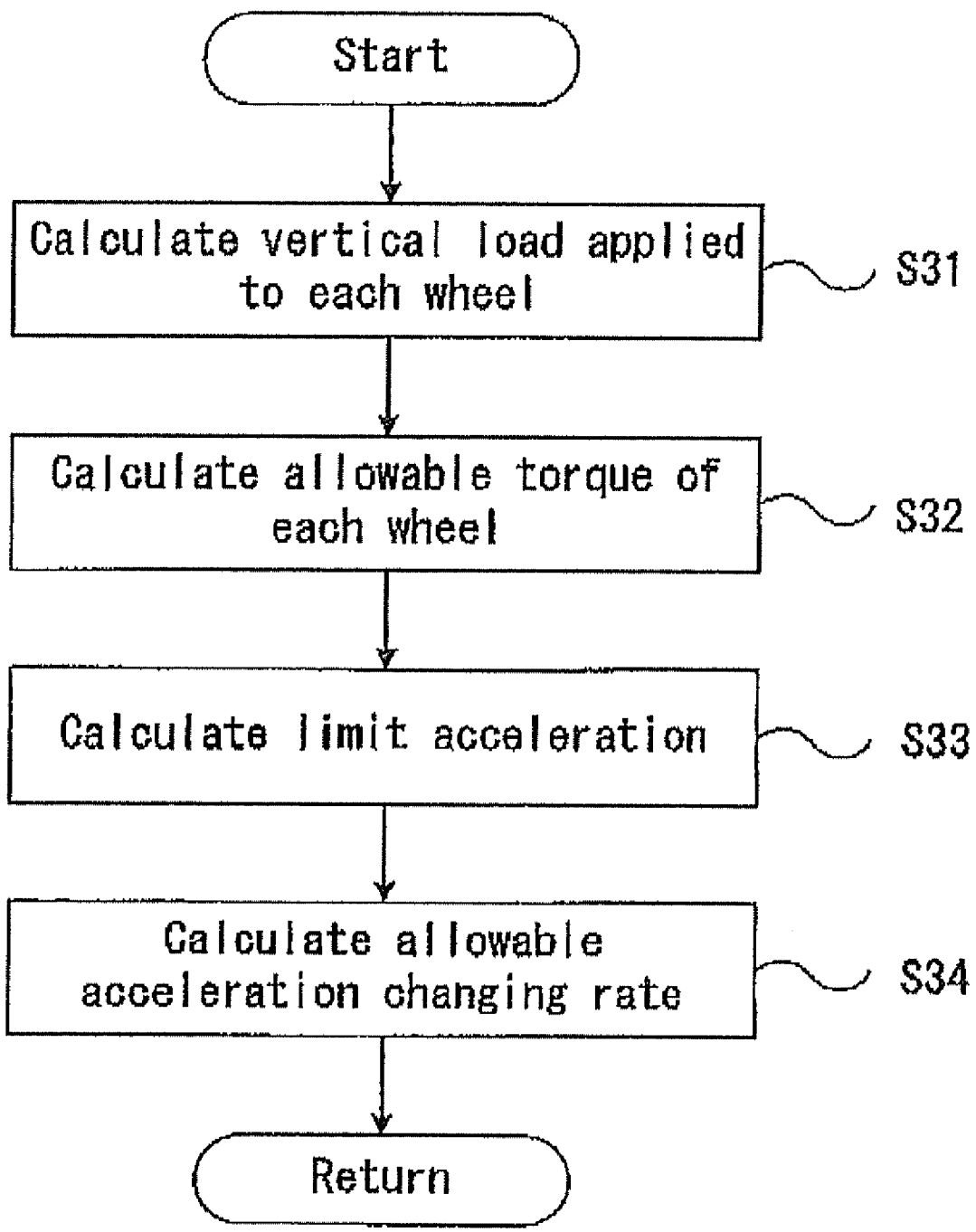
FIG. 9 is a flowchart showing a process of calculating an allowable torque, limit acceleration and an allowable acceleration changing rate.

The process of calculating the allowable torque, the limit acceleration and the allowable acceleration changing rate executed at step S3 in FIG. 6 will be described in detail below in accordance with a flowchart illustrated in FIG. 9. The electronic control unit 5 calculates the vertical load applied to each wheel by distributing the load of the vehicle 1 to each wheel on the basis of static weight distribution determined by a position of a center of gravity of the vehicle 1 and a wheelbase and on the basis of dynamic weight distribution determined by effects of the road surface gradient, pitching motion and the like (step S31). The electronic control unit 5 calculates the allowable torque on the basis of the vertical load applied to each wheel and the friction coefficient of the road surface in response to the road surface gradient at the torque calculation means 31 (step S32), and then calculates the limit acceleration on the basis of the road surface gradient and the value of the sum of the allowable torques of the four wheels at the limit acceleration calculation means 32 (step S33). The electronic control unit 5 calculates the allowable acceleration changing rate at the request acceleration determination means (step S34).

Other Embodiments

In the above-described embodiment, the friction coefficient of the road surface is calculated in accordance with the operating process indicated by the flowchart in FIG. 8. However, the calculation process of the friction coefficient of the road surface is appropriately modifiable. For example, the friction coefficient of the road surface may be estimated from image information obtained by a CCD camera and the like mounted on the vehicle 1.

The calculation of the limit acceleration is not limited to the above-described calculation method based on the allowable torques of four wheels. Alternatively, for example, the limit acceleration may be calculated on the basis of the allowable torques of the driving wheels.

In the above-described embodiment, the allowable torque is calculated for each wheel. Alternatively, for example, an allowable torque in the first hydraulic circuit 10a including the rear-right wheel RR and the rear-left wheel RL connected to the first hydraulic circuit 10a may be calculated, and an allowable torque in the second hydraulic circuit 10b including the front-right wheel FR and the front-left wheel FL connected to the second hydraulic circuit 10b may be calculated. Alternatively, an allowable torque may be calculated for each circuit of the hydraulic brake device 6.

Further, in the above-described embodiment, the request braking torque may be individually applied to each wheel by configuring the vehicle 1 as an electrically driven type vehicle being provided with an electric motor for driving wheel at each wheel. Hence, in the electrically driven type vehicle, the request driving torque may be independently applied to each wheel, as is the case with the above-described request braking torque.

In the above-described embodiment, the hydraulic circuit 10 may be configured, for example, so that the master cylinder hydraulic pressure is applied to the front-right wheel cylinder 9FR and the rear-left wheel cylinder 9RL provided at the front-right wheel FR and the rear-left wheel RL, respectively in the first hydraulic circuit 10a, and so that the master cylinder hydraulic pressure is applied to the front-left wheel cylinder 9FL and the rear-right wheel cylinder 9RR provided at the front-left wheel FL and the rear-right wheel RR, respectively in the second hydraulic circuit 10b. In other words, the configuration of the hydraulic circuit 10 is appropriately modifiable so that the master cylinder hydraulic pressure is applied to the wheel cylinders 9 through any desired circuits.

According to the above-described embodiments, the automatic drive control of the embodiments related to the present invention is adaptable to various types of the vehicle drive control device for automatically driving a vehicle so as not to cause a slip at a wheel.

Accordingly, the limit acceleration calculation means 32 calculates the limit acceleration in which the vertical load applied to each wheel, the friction coefficient of the road surface and the allowable torque of each wheel are taken into consideration. In a case where the vehicle 1 is automatically driven so as not to exceed the limit acceleration, the slip is prevented from occurring at each wheel. On the other hand, in order to automatically drive the vehicle 1, the automatic drive control means 50 applies the predetermined torque, based on continuously inputted acceleration, to the wheels FR, FL, RR, and RL. When the automatic drive control means 50 applies the predetermined torque to each wheel, the request acceleration determination means 33, having the above-described configuration, calculates the request acceleration, which does not cause the slip occurring due to the acceleration acting on the vehicle 1, at each wheel, on the basis of the limit acceleration and the initially determined request acceleration. Then, the request acceleration determination means 33 outputs the request acceleration, replacing the initially determined request acceleration, to the automatic drive control means 50. Accordingly, the automatic drive control means 50 applies the predetermined torque, based on the continuously inputted acceleration, to each wheel, so that the vehicle 1 is automatically driven without causing the slip at each wheel.

As a result, the control device having the above-described configuration achieves stable automatic drive of the vehicle without causing the slip.

According to the embodiments, the request acceleration determination means 33 is configured to determine the initially determined request acceleration as the request acceleration in a case where the initially determined request acceleration is equal to or lower than the limit acceleration, and to determine the limit acceleration as the request acceleration in a case where the initially determined request acceleration is greater than the limit acceleration.

Accordingly, the request acceleration determination means 33 compares the limit acceleration and the initially determined request acceleration, and surely calculates the request acceleration so as not to exceed the limit acceleration. Therefore, the wheels are surely prevented from slipping, and the automatic drive of the vehicle becomes more stable.

According to the embodiments, the torque calculation means 31 is configured to calculate the allowable torque of each wheel (FR, FL, RR, RL) on the basis of the vertical load applied to each wheel (FR, FL, RR, RL) calculated on the basis of a static weight distribution relative to each wheel (FR, FL, RR, RL), determined by a position of a center of gravity of the vehicle 1 and a wheelbase, and a dynamic weight distribution relative to each wheel, determined by an effect of a road surface gradient.

The vertical load applied to each wheel changes in response to the road surface gradient. For examples, in a case where the vehicle is driven on a rising ascent, the loads applied to the front wheels FR and FL are decreased and the loads applied to the rear wheels RR and RL are increased. On the other hand, in a case where the vehicle is driven on a falling descent, the loads applied to the front wheels FR and FL are increased and the loads applied to the rear wheels RR and RL are decreased. Hence, a slip tendency of each wheel changes in response to the road surface gradient. As described above, the torque calculation means 31 of the embodiments calculates the vertical load applied to each wheel while taking the dynamic weight distribution calculated in response to the road surface gradient into consideration in addition to the static weight distribution. As a result, the vehicle drive control, device of the embodiments is widely adaptable to various conditions of the road surface, and the automatic drive of the vehicle becomes more stable.

According to the embodiments, the request acceleration determination means 33 is configured to determine an allowable acceleration changing rate so that the torque applied to each wheel (FR, FL, RR, RL) by the automatic drive control means 50 falls within a predetermined range, and to output the calculated request acceleration to the automatic drive control means 50 on the basis of the determined allowable acceleration changing rate.

In applying the torque to each of the wheels FR, FL, RR and RL, for example, the automatic drive control means 50 executes the feedback calculation for calculating the adjustment amount of the acceleration on the basis of the deviation between the inputted request acceleration and a current acceleration, then the automatic drive control means 50 applies the torque to each of the wheels FR, FL, RR and RL in response to the adjustment amount of the acceleration. When the changing rate of the request acceleration increases while the automatic drive control means 50 applied the torque to each of the wheels FR, FL, RR and RL, the adjustment amount of the acceleration calculated by the feedback calculation becomes large, and the so-called overshoot, in which the acceleration acting on the vehicle exceeds the limit acceleration, may occur. Consequently, the torque applied to each wheel may exceed the allowable torque, and the slip may occur at each wheel. Therefore, in order to prevent the occurrence of the overshoot and slip at each wheel, the request acceleration determination means 33 of the embodiments does not only output the calculated request acceleration to the automatic chive control means 50, but also determines the allowable acceleration changing rate so that the torque applied to each wheel falls within the predetermined range, and then, the request acceleration determination means 33 outputs the allowable acceleration changing rate to the automatic drive control means 50 in addition to the request acceleration. Accordingly, the automatic drive control means 50 prevents the adjusting amount of the acceleration, calculated by the feedback calculation, from being over-increased, and controls the acceleration acting on the vehicle 1 to become smaller than the limit acceleration. As a result, the reliability of the feedback calculation is increased, and automatic drive control of the vehicle becomes stable.

According to the embodiments, the predetermined range is set on the basis of a range for not causing the slip at each wheel (FR, FL, RR, RL) when the torque is applied thereto.

Accordingly, the request acceleration determination means 33 determines the allowable acceleration changing rate so that the torque applied to each wheel by the automatic drive control means 50 falls within the range within which the torque does not cause the slip at each wheel. As a result, the slip is surely prevented from occurring at each wheel, and the automatic drive control of the vehicle becomes further stables.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A vehicle drive control device comprising:
  an initially determined request acceleration calculation means for calculating an initially determined request acceleration for controlling a driving state of a vehicle;
  an automatic drive control means for receiving the initially determined request acceleration and applying a predetermined torque to each wheel of the vehicle on the basis of the inputted initially determined request acceleration in an automatic drive control;
  a torque calculation means for calculating an allowable torque not causing a slip at each wheel when the allowable torque is applied thereto, on the basis of a vertical load applied to each wheel and a friction coefficient of a road surface;
  a limit acceleration calculation means for calculating a limit acceleration acting on the vehicle in a case where the calculated allowable torque is applied to each wheel; and
  a request acceleration determination means for obtaining a request acceleration as an acceleration actually acting on the vehicle on the basis of the limit acceleration and the initially determined request acceleration, and for outputting the request acceleration, replacing the initially determined request acceleration, to the automatic drive control means.

2. The vehicle drive control device according to claim 1, wherein the request acceleration determination means is configured to determine the initially determined request acceleration as the request acceleration in a case where the initially determined request acceleration is equal to or lower than the limit acceleration, and to determine the limit acceleration as the request acceleration in a case where the initially determined request acceleration is greater than the limit acceleration.

3. The vehicle drive control device according to claim 1, wherein the torque calculation means is configured to calculate the allowable torque of each wheel on the basis of the vertical load applied to each wheel calculated on the basis of a static weight distribution relative to each wheel, determined by a position of a center of gravity of the vehicle and a wheelbase, and a dynamic weight distribution relative to each wheel, determined by an effect of a road surface gradient.

4. The vehicle drive control device according to claim 2, wherein the torque calculation means is configured to calculate the allowable torque of each wheel on the basis of the vertical load applied to each wheel calculated on the basis of a static weight distribution relative to each wheel, determined by a position of a center of gravity of the vehicle and a wheelbase, and a dynamic weight distribution relative to each wheel, determined by an effect of a road surface gradient.

5. The vehicle drive control device according to claim 1, wherein, the request acceleration determination means is configured to determine an allowable acceleration changing rate so that the torque applied to each wheel by the automatic drive control means falls within a predetermined range, and to output the calculated request acceleration to the automatic drive control means on the basis of the determined allowable acceleration changing rate.

6. The vehicle drive control device according to claim 3, wherein, the request acceleration determination means is configured to determine the allowable acceleration changing rate so that the torque applied to each wheel by the automatic drive control means falls within the predetermined range, and to output the calculated request acceleration to the automatic drive control means on the basis of the determined allowable acceleration changing rate.

7. The vehicle drive control device according to claim 5, wherein the torque calculation means is configured to calculate the allowable torque of each wheel on the basis of the vertical load applied to each wheel calculated on the basis of die static weight distribution relative to each wheel, determined by the position of the center of gravity of the vehicle and the wheelbase, and the dynamic weight distribution relative to each wheel, determined by the effect of the road surface gradient.

8. The vehicle drive control device according to claim 5, wherein the predetermined range is set on the basis of a range for not causing the slip at each wheel when the torque is applied thereto.

9. The vehicle drive control device according to claim 6, wherein the predetermined range is set on the basis of a range for not causing the slip at each wheel when the torque is applied thereto.

* * * * *